United States Patent
Akasaka

(10) Patent No.: US 9,724,731 B2
(45) Date of Patent: Aug. 8, 2017

(54) ELECTRONIC DEVICE WITH FIRST AND SECOND VIBRATION PORTIONS

(71) Applicant: NIKON CORPORATION, Tokyo (JP)

(72) Inventor: Satoshi Akasaka, Yokohama (JP)

(73) Assignee: NIKON CORPORATION, Tokyo (JP)

(*) Notice: Subject to any disclaimer, the term of this patent is extended or adjusted under 35 U.S.C. 154(b) by 0 days.

(21) Appl. No.: 14/521,061

(22) Filed: Oct. 22, 2014

(65) Prior Publication Data
US 2015/0108854 A1 Apr. 23, 2015

Related U.S. Application Data

(63) Continuation of application No. PCT/JP2013/062162, filed on Apr. 25, 2013.

(30) Foreign Application Priority Data

Apr. 27, 2012 (JP) .................................. 2012-102708

(51) Int. Cl.
| | | |
|---|---|---|
| H02K 41/03 | (2006.01) | |
| H02K 5/24 | (2006.01) | |
| H02K 5/10 | (2006.01) | |
| H02N 2/00 | (2006.01) | |
| B06B 1/04 | (2006.01) | |
| H04M 19/04 | (2006.01) | |
| G06F 3/01 | (2006.01) | |
| H02K 33/18 | (2006.01) | |
| B06B 1/14 | (2006.01) | |

(52) U.S. Cl.
CPC ............... *B06B 1/045* (2013.01); *B06B 1/14* (2013.01); *G06F 3/016* (2013.01); *H02K 33/18* (2013.01); *H04M 19/047* (2013.01); *B06B 2201/53* (2013.01)

(58) Field of Classification Search
CPC .................................. G06F 3/045; H04R 3/12
USPC ........ 310/25, 12.16, 51, 81, 320; 340/407.2; 701/409
See application file for complete search history.

(56) References Cited

U.S. PATENT DOCUMENTS

| | | | | |
|---|---|---|---|---|
| 2006/0049920 | A1* | 3/2006 | Sadler | G06F 1/1626 340/407.1 |
| 2012/0038582 | A1* | 2/2012 | Grant | G06F 3/016 345/174 |
| 2012/0150431 | A1* | 6/2012 | Ooka | G01C 21/20 701/425 |

FOREIGN PATENT DOCUMENTS

| | | | | |
|---|---|---|---|---|
| JP | H10-161805 | A | 6/1998 | |
| JP | 2003-058321 | A | 2/2003 | |
| JP | 2003058321 | A * | 2/2003 | ........... G06F 3/0488 |

(Continued)

OTHER PUBLICATIONS

Translation of International Preliminary Report on Patentability of PCT/JP2013/062162, dated Jul. 30, 2013, 8 pages.

(Continued)

*Primary Examiner* — Jose Gonzalez Quinones
(74) *Attorney, Agent, or Firm* — Foley & Lardner LLP

(57) ABSTRACT

An electronic device includes a housing having a plurality of surfaces and a plurality of vibration portions provided in the housing so as to be in contact with at least one of the plurality of surfaces. The plurality of vibration portions include a first vibration portion, which vibrates at a frequency included in a first frequency band, and a second vibration portion, which vibrates at a frequency included in a second frequency band that is different from the first frequency band.

6 Claims, 5 Drawing Sheets

(56) References Cited

FOREIGN PATENT DOCUMENTS

| JP | 2003-290717 A | | 10/2003 |
|---|---|---|---|
| JP | 2006-157642 A | | 6/2006 |
| JP | 2006157642 A | * | 6/2006 |
| JP | 2010-086089 A | | 4/2010 |

OTHER PUBLICATIONS

Japanese Office Action dated Apr. 25, 2017 as issued in corresponding Japanese Application No. 2014-512672 and its English translation thereof.

* cited by examiner

ELECTRONIC DEVICE WITH FIRST AND SECOND VIBRATION PORTIONS

CROSS-REFERENCE TO RELATED APPLICATION

Priority is claimed on Japanese Patent Application No. 2012-102708, filed on Apr. 27, 2012, the contents of which are incorporated herein by reference. The present application is a continuation application of International Application PCT/JP2013/062162, filed on Apr. 25, 2013. The contents of the above application are incorporated herein.

BACKGROUND

Technical Field

The present invention relates to an electronic device.

As an electronic device, such as a mobile phone or a portable information terminal, for example, an electronic device disclosed in Japanese Unexamined Patent Application, First Publication No. 2010-86089 is known. In the electronic device disclosed in Japanese Unexamined Patent Application, First Publication No. 2010-86089, a configuration to make a user detect vibrations may be used. As a vibration generator that generates such vibrations, for example, a vibration motor is known.

SUMMARY

However, the conventional vibration motor has a limited frequency band. Accordingly, it has been difficult to generate low-frequency vibrations and high-frequency vibrations uniformly even though it is possible to generate either low-frequency vibrations or high-frequency vibrations. For this reason, it has been difficult to reproduce a wide range of vibration states.

An aspect of the present invention is to provide an electronic device capable of reproducing a wide range of vibration states.

According to an aspect of the present invention, there is provided an electronic device including a housing having a plurality of surfaces and a plurality of vibration portions provided in the housing so as to be in contact with at least one of the plurality of surfaces. The plurality of vibration portions include a first vibration portion, which vibrates at a frequency included in a first frequency band, and a second vibration portion, which vibrates at a frequency included in a second frequency band that is different from the first frequency band.

According to the aspect of the present invention, it is possible to provide an electronic device capable of reproducing a wide range of vibration states.

DESCRIPTION OF THE EMBODIMENTS

Figure 1:
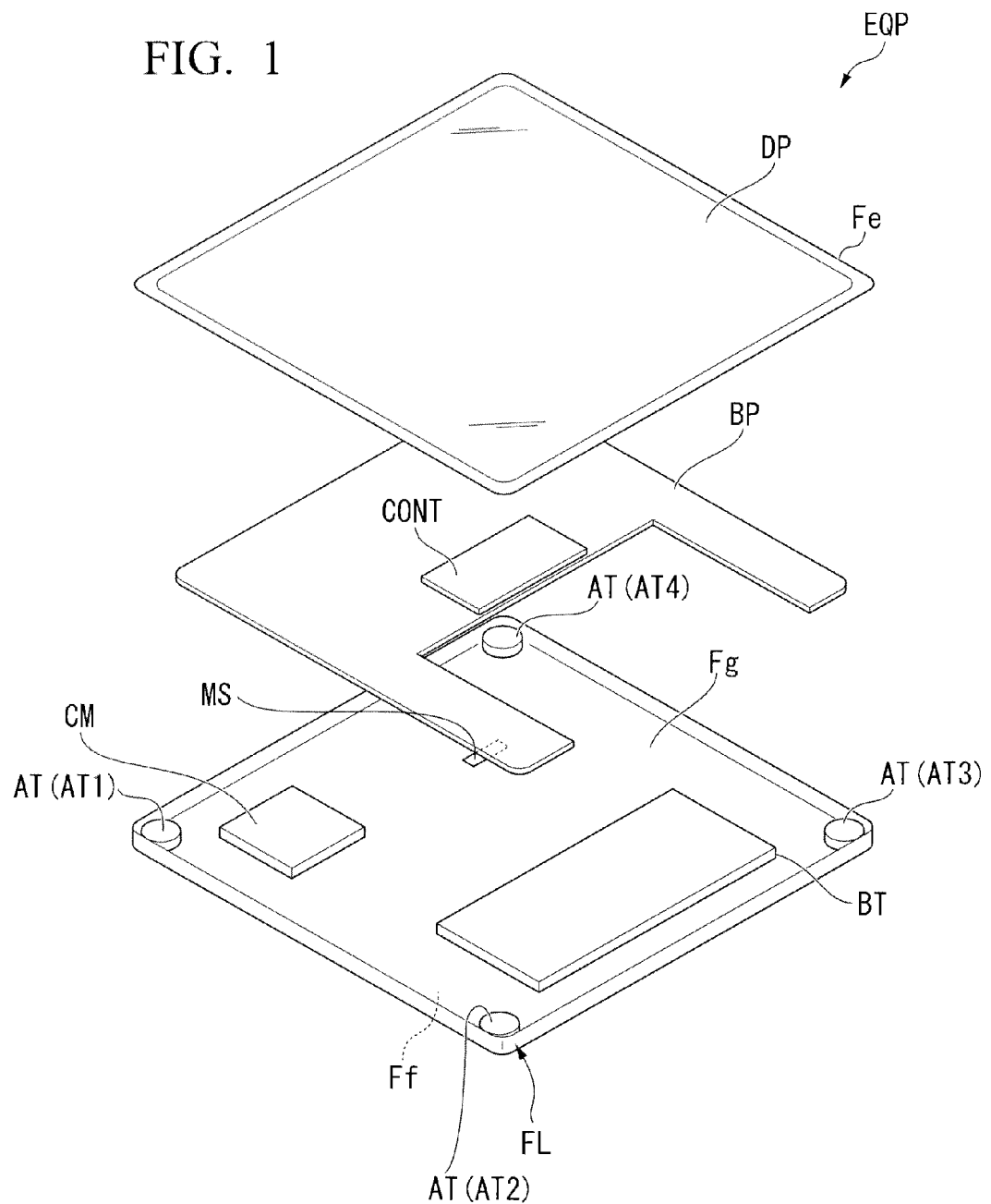
FIG. 1 is a perspective view showing the configuration of a portable information terminal according to an embodiment of the present invention.

Hereinafter, an embodiment of the present invention will be described in detail with reference to the diagrams. FIG. 1 is a perspective view showing the configuration of a portable information terminal EQP according to the present embodiment.

As shown in FIG. 1, the portable information terminal (electronic device) EQP includes a controller CONT, a display part DP, a substrate BP, a camera module CM, a rechargeable battery BT, a microphone MC (not shown), a speaker SP (not shown), a vibration part AT, and a connection part MS, and these elements are housed in a housing FL.

The housing FL (main body) has a plurality of surfaces, and is formed in a rectangular plate shape, for example.

The controller CONT, the display part DP, the substrate BP, the camera module CM, the rechargeable battery BT, the microphone MC, the speaker SP, a plurality of vibration parts AT, and the connection part MS are electrically connected to each other.

The display part DP is formed in a rectangular shape, and is provided on the plate surface of the housing FL. Hereinafter, the surface of the housing FL on which the display part DP is provided is referred to as a display surface Fe. The display part DP includes a display panel having a liquid crystal device or an organic EL device, for example. A touch panel is provided in a display region of the display panel. The display region is a rectangle. The touch panel detects the presence or absence of contact with respect to the display region and the touch position. As shown in the diagram, the display surface Fe and the display region of the display panel are almost equal. In addition, only the display part DP is provided on the display surface Fe.

The substrate BP is provided in the housing FL. The controller CONT, a radio communication part that performs radio communication through, for example, wireless fidelity (Wi-Fi), and various sensors (not shown) such as an acceleration sensor, a gyro (angular velocity sensor), and a global positioning system (GPS), are provided on the substrate BP. The controller CONT includes a memory and a central processing unit (CPU), and performs overall control of the portable information terminal EQP.

The rechargeable battery BT supplies electric power to each component. The rechargeable battery BT is provided in the housing FL, and can also be detached from the housing FL as necessary.

The camera module CM includes a lens and an image sensor, and images a subject to generate image data. In the camera module CM herein, the lens is provided on a back surface Ff with respect to the display surface Fe of the housing FL. However, the number of lenses or the installation place is changed when necessary.

Figure 2:
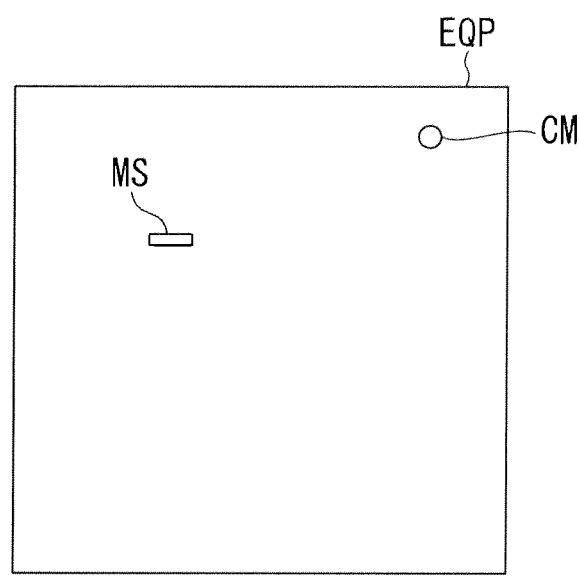
FIG. 2 is a cross-sectional view showing the configuration of a part of the portable information terminal according to the present embodiment.

FIG. 2 is a back view of the portable information terminal EQP. The camera module CM and the connection part MS are provided on the back surface Ff of the portable information terminal EQP. In addition, the microphone MC (not shown) and the speaker SP (not shown) are provided on the back surface Ff of the portable information terminal EQP.

The vibration part AT is a vibration source for transmitting vibrations to the housing FL. The vibration part AT includes a plurality of (in the present embodiment, four) vibration elements AT1 to AT4. The vibration elements AT1 to AT4 are respectively provided in four substantial corners (a plurality of different corners) of the housing FL. In other words, the vibration elements AT1 to AT4 are respectively provided in the vicinity of the four corners of the display surface Fe. Each of the vibration elements AT1 to AT4 is a linear vibration actuator having specified frequency characteristics. The operation of the vibration part AT is controlled by the controller CONT.

Among the vibration elements AT1 to AT4, for example, the vibration elements AT1 and AT2 (first vibration portion) vibrate at a frequency included in a band (first frequency band) equal to or higher than about 50 Hz and less than about 100 Hz. The vibration elements AT1 and AT2 may be configured so as to vibrate at the same frequency, or the vibration elements AT1 and AT2 may be configured so as to vibrate at different frequencies.

In addition, for example, the vibration elements AT3 and AT4 (second vibration portion) vibrate at a frequency included in a band (second frequency band) equal to or higher than about 100 Hz and less than about 20 KHz, different from the vibration elements AT1 and AT2. The vibration elements AT3 and AT4 may be configured so as to vibrate at the same frequency, or the vibration elements AT3 and AT4 may be configured so as to vibrate at different frequencies.

Figure 3A:
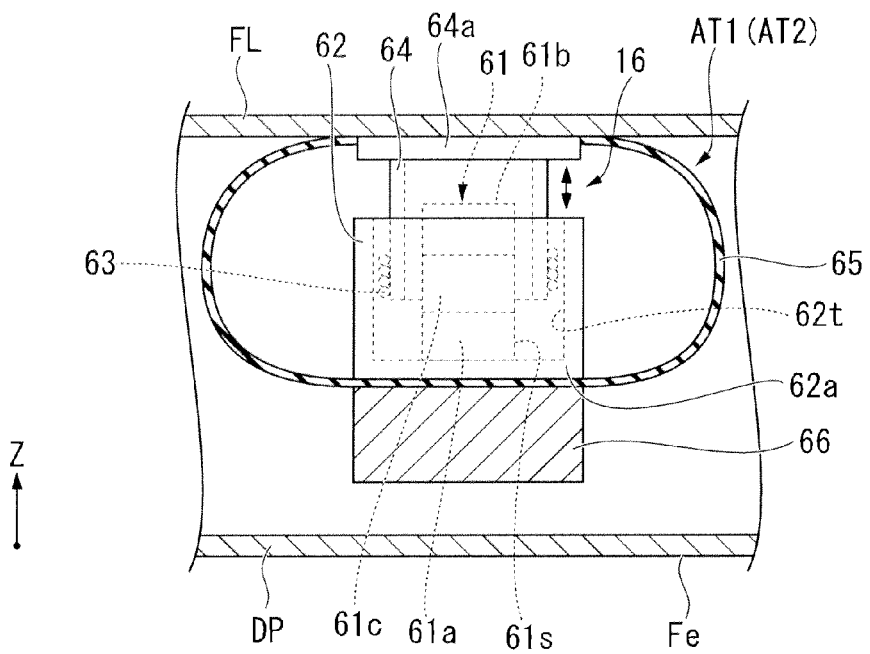
FIG. 3A is a cross-sectional view showing the configuration of a vibration portion of the portable information terminal according to the present embodiment.
Figure 3B:
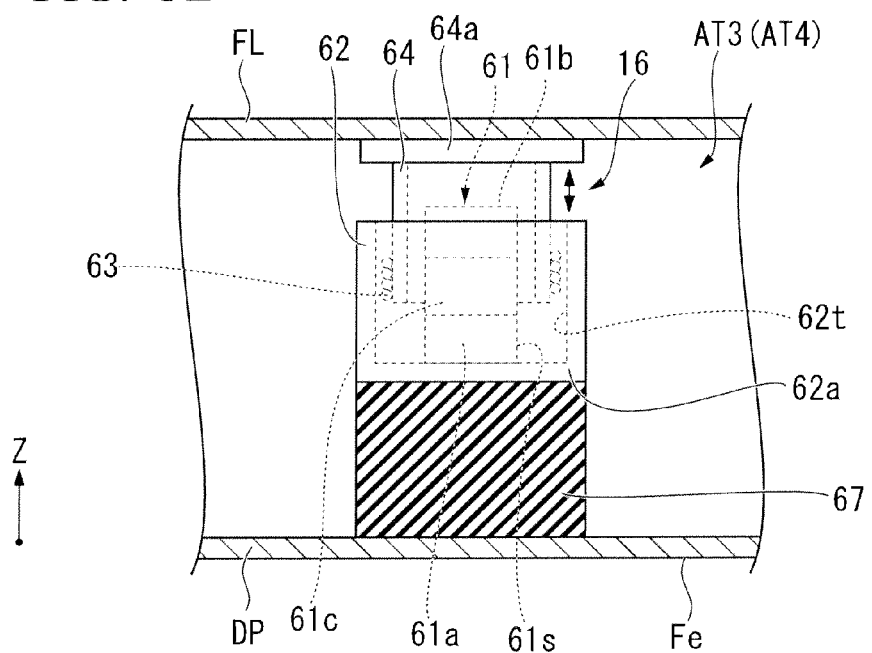
FIG. 3B is a cross-sectional view showing the configuration of the vibration portion of the portable information terminal according to the present embodiment.

FIGS. 3A and 3B are diagrams showing the configuration of the vibration elements AT1 to AT4. FIG. 3A is a diagram showing the configuration of the vibration elements AT1 and AT2 that are the first vibration portion. FIG. 3B is a diagram showing the configuration of the vibration elements AT3 and AT4 that are the second vibration portion. Each of the vibration elements AT1 to AT4 is substantially connected to a part of the housing FL. For example, each of the vibration elements AT1 to AT4 is provided inside the housing FL so as to be substantially connected to at least one of a plurality of surfaces of the housing FL.

In FIGS. 3A and 3B, explanation will be given on the assumption that a direction perpendicular to the display surface Fe is a Z direction. In this case, a direction toward the housing FL from the display part DP is a +Z direction, and a direction toward the display part DP from the housing FL is a −Z direction.

In FIGS. 3A and 3B, one vibration element (for example, the vibration element AT1 in FIG. 3A, and the vibration element AT3 in FIG. 3B) is representatively shown. The following explanation of FIG. 3A is relevant to the vibration element AT1. The explanation of FIG. 3B is relevant to the vibration element AT3. However, the same explanation can also be given for the vibration elements AT2 and AT4.

As shown in FIG. 3A, the vibration element AT1 includes a voice coil motor 16. The voice coil motor 16 includes a center pole 61, a yoke 62, a coil 63, and a coil support portion 64. The voice coil motor 16 is configured to generate vibrations when the center pole 61 and the yoke 62 are reciprocated in the Z direction by the Lorentz force acting between a current flowing through the coil 63 and a magnetic field between the center pole 61 and the yoke 62 under the control of the controller CONT.

The yoke 62 is formed in a cylindrical shape using a material containing a magnetic material, such as iron, for example. In the yoke 62, one end (for example, an end on the +Z side in the diagram) in the axial direction is opened, and a bottom portion 62a is provided at the other end (for example, an end on the −Z side in the diagram) in the axial direction.

The center pole 61 is formed in a cylindrical shape. The center pole 61 is housed inside the yoke 62. The center pole 61 and the yoke 62 are disposed such that the axial direction is parallel to the Z direction. The center pole 61 is disposed at the middle of the yoke 62, for example. The center pole 61 is disposed so as to have a gap between an outer peripheral surface 61s and an inner peripheral surface 62t of the yoke 62.

The center pole 61 includes a first magnet 61a, a second magnet 61b, and a disc member 61c that are respectively formed in a disc shape having the same diameter. The center pole 61 has a configuration in which the disc member 61c is interposed between the first and second magnets 61a and 61b in the axial direction. The first magnet 61a is in contact with the bottom portion 62a of the yoke 62. Similar to the yoke 62, the disc member 61c is formed using a material containing a magnetic material, such as iron, for example. Accordingly, the disc member 61c has a function as a yoke.

In the first magnet 61a, one end (for example, an end on the upper side in the diagram) in the axial direction is an N pole, and the other end (for example, an end on the lower side in the diagram) in the axial direction is an S pole. In the second magnet 61b, one end (for example, an end on the upper side in the diagram) in the axial direction is an S pole, and the other end (for example, an end on the lower side in the diagram) in the axial direction is an N pole. Accordingly, in the first and second magnets 61a and 61b, the ends in contact with the disc member 61c are N poles. In the first magnet 61a, the end in contact with the bottom portion 62a of the yoke 62 is an S pole. Therefore, between the disc member 61c and the yoke 62, the disc member 61c is an N pole, and the yoke 62 is an S pole.

The coil 63 is disposed at space K interposed between the outer peripheral surface 61s of the center pole 61 and the inner peripheral surface 62t of the yoke 62. The coil 63 is formed using copper wire, for example.

The coil support portion 64 fixes and supports the coil 63. The coil support portion 64 is formed in a cylindrical shape. The coil 63 is fixed to the −Z-side end of the coil support portion 64 in a wound state. A portion of the coil support portion 64 to which the coil 63 is fixed is inserted into the space K. The coil support portion 64 is formed using a non-magnetic material, such as plastic, for example. The coil support portion 64 can move integrally with the coil 63. The end of the coil support portion 64 on the −Z side is fixed to the housing FL (fixed portion 64a).

In addition, an elastic member 65 is attached to the fixed portion 64a of the coil support portion 64. The elastic member 65 is formed in the shape of a spring using an elastically deformable material, and is provided so as to support the yoke 62. Therefore, in the voice coil motor 16, the coil support portion 64 is fixed (connected) to one surface (first surface) of the housing FL, and the yoke 62 is supported on (connected to) the other surface (second surface) of the housing FL by the elastic member 65. For example, the first surface faces the second surface, and/or the first surface is parallel to the second surface. In addition, a weight 66 is attached to the elastic member 65. Thus, the weight 66 is connected to the fixed portion 64a of the coil support portion 64.

In the voice coil motor 16, a current flows through the coil 63 by an electrical signal from the controller CONT. Accordingly, a force is applied to the coil 63 in the +Z direction and the −Z direction. By the force, the coil support portion 64 (stator) and the center pole 61 (movable element) move relative to each other. The coil support portion 64 is fixed to the display part DP. Therefore, the vibration of the voice coil motor 16 is transmitted to the housing FL through the coil support portion 64.

By the relative movement between the coil support portion 64 and the center pole 61, the center pole 61 and the yoke 62 (movable element) are moved in the Z direction while receiving an elastic force. In this case, the mass of the weight 66 acts on the movement of the center pole 61 and the yoke 62 in addition to the mass of the center pole 61 and the yoke 62. For this reason, the period of vibration is increased in a case where the weight 66 is not attached.

Therefore, in the vibration element AT1, vibrations at a frequency in a band lower than a frequency when the weight 66 is not attached to the voice coil motor 16 are generated. In addition, it is possible to change the frequency characteristics by changing the mass of the weight 66. That is, since the center pole 61, the yoke 62, and the weight 66 that are supported by the elastic member 65 serve as a weight, the housing FL can be effectively vibrated at a low frequency of the electrical signal from the controller CONT. Also for the vibration element AT2, the same explanation can be given.

As shown in FIG. 3B, the vibration element AT3 includes the same voice coil motor 16 as the configuration provided in the above described vibration element AT1, for example. Needless to say, it is also possible to use a voice coil motor having a different configuration from that in the vibration element AT1 or other types of vibration elements, such as a piezoelectric type vibration element. The elastic member 65, the weight 66, and the like are not attached to the bottom portion 62a of the yoke 62 of the vibration element AT3. Instead, the bottom portion 62a of the yoke 62 is supported by the housing FL, for example, through an elastic member 67, such as a sponge.

The elastic member 67 supports the yoke 62, and functions as a cushioning material that reduces the vibration transmitted to the display part DP from the voice coil motor 16. In the vibration element AT3, a support mechanism using the elastic member 65 is not attached to the voice coil motor 16. Therefore, in the vibration elements AT3 and AT4, vibrations at a high frequency are generated compared with the vibration elements AT1 and AT2. In addition, this is a structure that is advantageous in terms of achieves a reduction in size and weight. Therefore, it is easy to dispose a vibration element at a position where the vibration is easily transmitted to the operator. Also for vibration element AT4, the same explanation can be given.

Thus, between the vibration elements AT1 and AT2 and the vibration elements AT3 and AT4, it is possible to perform vibration at frequencies of different hands.

Next, the operation of the portable information terminal EQP configured as described above will be described.

The portable information terminal EQP outputs image data, which is stored in such as a memory of the controller CONT or an external memory, or image data, which is obtained by communication through a radio communication part, to the display part DP, and displays the image data as an image. In addition, the portable information terminal EQP outputs voice data, which is similarly stored in such as the memory of the controller CONT or the external memory, from the speaker SP. Furthermore, the portable information terminal EQP communicates with the outside in order to transmit and receive data including the image data and the voice data. In addition, the portable information terminal EQP vibrates the vibration part AT when an event, such as the reception of communication data or an alarm, occurs.

[User Operation]

The controller CONT performs the output and communication of image data or voice data based on the operation of the user. For the posture of the housing FL of the portable information terminal EQP, for example, as shown in FIG. 4, when a direction toward a side surface Fb from a side surface Fa is a gravity direction, the controller CONT displays identification displays corresponding to, for example, processes 1 to 10 in display regions 31 to 40 of the display part DP.

Figure 4:
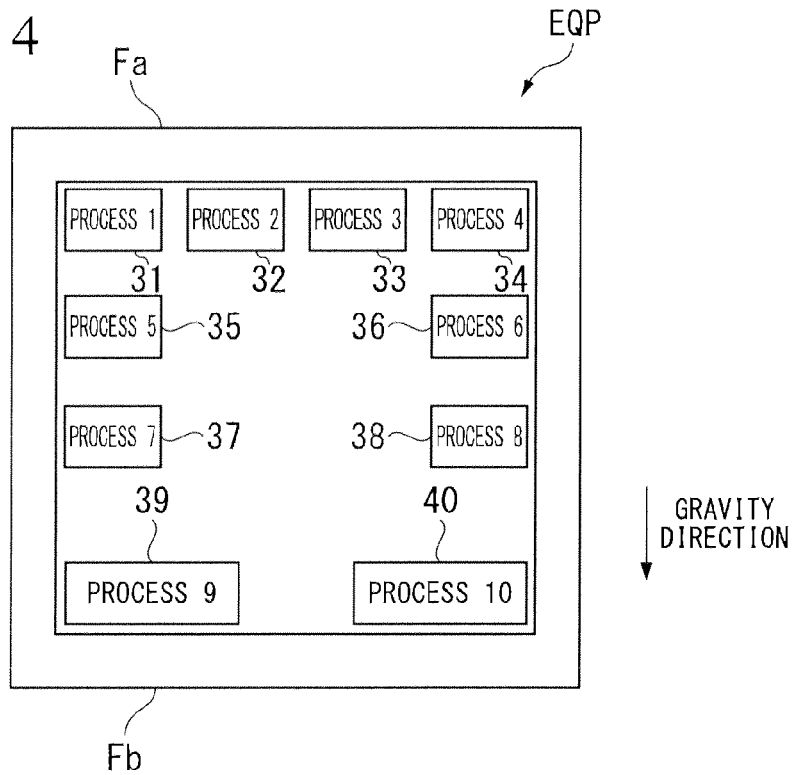
FIG. 4 is a diagram showing a form of the operation of the portable information terminal according to the present embodiment.
Figure 5:
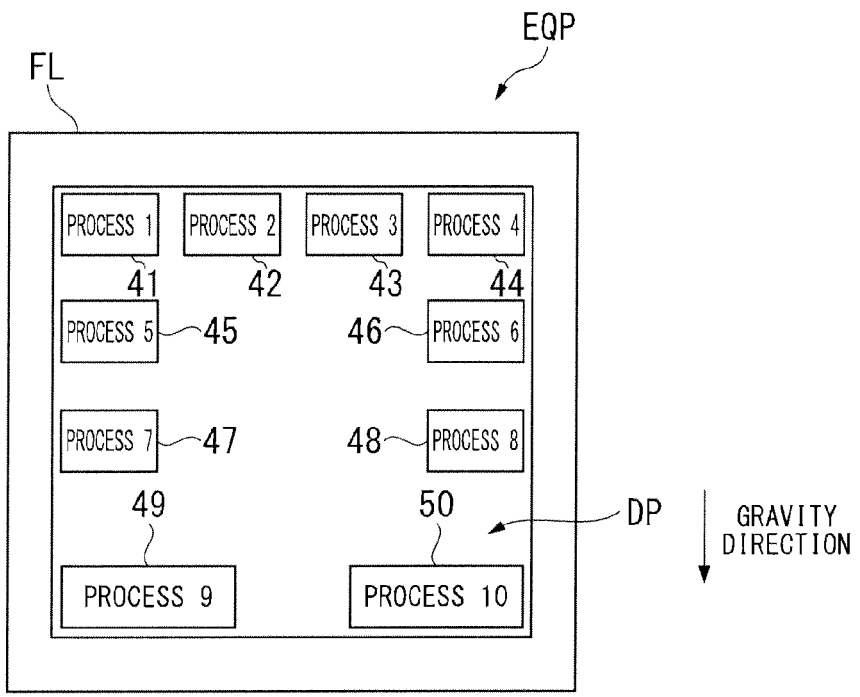
FIG. 5 is a diagram showing a form of the operation of the portable information terminal according to the present embodiment.

In this case, in FIG. 5, similar to the state shown in FIG. 4, when the user touches a region overlapping one of display regions 41 to 50 of the touch panel, the controller CONT detects the touch position on the touch panel using a display part detection part (not shown) and performs a process corresponding to the identification display that is displayed on the touch position. For example, when the user touches a portion overlapping the display region 41 of the touch panel, the controller CONT performs a process (process 1) displayed on the display region 41.

[Generation of Vibration]

Next, vibrations generated by the portable information terminal EQP when an event occurs will be described. The controller CONT stores a correspondence table, in which an event and a vibration pattern correspond to each other, in advance.

When an event occurs, the controller CONT reads the vibration pattern corresponding to the occurred event from the correspondence table, and vibrates the vibration part AT in the read vibration pattern.

For example, when an event "normal data reception" occurs, the controller CONT vibrates the vibration elements AT1 and AT2 among the plurality of vibration parts AT at a predetermined frequency between 50 Hz to 100 Hz. In addition, for example, when an event "important data reception" occurs, the controller CONT vibrates the vibration elements AT3 and AT4 at a predetermined frequency between 100 Hz to 20 KHz. In this case, it is possible to generate a beat vibration of 4 Hz by vibrating the vibration element AT3 at a frequency of 148 Hz and vibrating the vibration element AT4 at a frequency of 152 Hz, for example.

As an example of the vibration pattern, the vibration elements AT1 and AT2 that generate low-frequency vibrations and the vibration elements AT3 and AT4 that generate high-frequency vibrations can be made to vibrate simultaneously. Thus, it is possible to generate low-frequency vibrations and high-frequency vibrations simultaneously. In addition, it can also be considered to vibrate a plurality of vibration elements simultaneously with different strengths. In this case, the strength ratio of the vibration elements may change with time. Therefore, the portable information terminal EQP can generate vibrations at a plurality of frequencies, which can be recognized by the user, according to the event.

As described above, according to the present embodiment, a plurality of vibration parts AT are provided inside the housing FL so as to be in contact with at least one surface of the housing FL and the display part DP. The plurality of vibration parts AT include the vibration elements AT1 and AT2 that vibrate at a frequency included in the first frequency band (for example, about 50 Hz to about 100 Hz) and the vibration elements AT3 and AT4 that vibrate at a frequency included in the second frequency band (for example, about 100 Hz to about 20 KHz) that is different from the first frequency band. That is, the lowest frequency in the second frequency band in the case of the vibration elements AT3 and AT4 is higher than the highest frequency in the first frequency band in the case of the vibration elements AT1 and AT2. Therefore, it is possible to reproduce a wide range of vibration states from the low frequency band to the high frequency band. In addition, the value of the frequency band is an example. Various frequency bands can be applied.

While the embodiment of the invention has been described in detail with reference to the diagrams, the specific configuration is not limited to the above-described embodiment, and various design changes and the like within the scope without departing from the subject matter of the invention can also be made.

For example, in the above embodiment, a configuration in which the vibration elements AT1 to AT4 are disposed at the corners of the housing FL has been described as an example. However, the invention is not limited thereto. For example, the vibration elements AT1 to AT4 may be disposed at central portions of the four sides of the housing FL.

Figure 6:
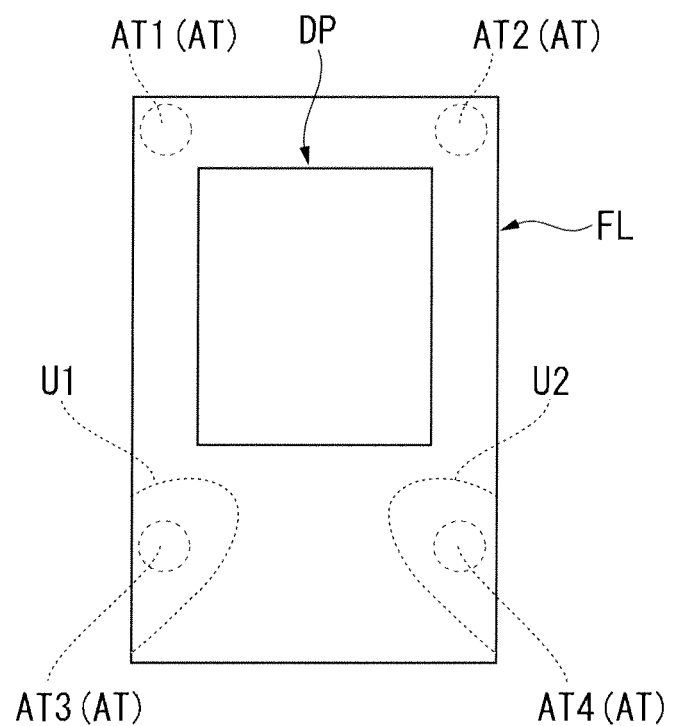
FIG. 6 is a plan view showing the configuration of a portable information terminal according to a modification example of the present invention.

In addition, for example, as shown in FIG. 6, when the housing FL is formed in a rectangular shape in plan view, a portion (for example, a portion U1 and a portion U2) that is used when a user holds the housing FL can be assumed to some extent depending on the position of the display part DP. In this case, vibration elements (for example, the vibration elements AT1 and AT2) to generate low-frequency vibrations may be disposed at the corners of the housing FL in plan view, and vibration elements (for example, the vibration elements AT3 and AT4) to generate high-frequency vibrations may be disposed at portions assumed to be held by the user. In addition, it is also possible to transfer quick vibrations to fingertips to operate the touch panel by disposing the vibration elements (for example, the vibration elements AT3 and AT4) for generating high-frequency vibrations at locations close to the touch panel.

In the above embodiment, the plate-shaped configuration in which the housing FL is formed in a rectangular shape has been described as an example. However, the invention is not limited thereto. For example, it is possible to adopt a plate-shaped configuration in which the housing FL is formed in other shapes, such as a rectangular shape, a circular shape, a triangular shape, and a polygonal shape. In addition, the housing FL may also be formed in other shapes, such as a spherical shape, a polygonal column shape, and a cylindrical shape, without being limited to the plate shape.

What is claimed is:

1. An electronic device, comprising:
a housing having a first surface and a second surface which faces the first surface; and
a plurality of vibration portions that are provided in the housing so as to be in contact with at least the first surface,
wherein the plurality of vibration portions include a first vibration portion, which vibrates at a frequency included in a first frequency band, and a second vibration portion, which vibrates at a frequency included in a second frequency band that is different from the first frequency band, and
wherein the first surface and the second surface are connected via the second vibration portion and an elastic member.

2. The electronic device according to claim 1, wherein a lowest frequency in the second frequency band is higher than a highest frequency in the first frequency band.

3. The electronic device according to claim 1, wherein each of the first and second vibration portions includes a voice coil motor.

4. The electronic device according to claim 1, wherein the first vibration portion and the second vibration portion include a movable element and a stator that move relative to each other in one direction, and the movable element is fixed to the first surface.

5. The electronic device according to claim 4, wherein the stator of the second vibration portion is fixed to the second surface through the elastic member.

6. The electronic device according claim 1, wherein the housing has corners in plan view, and the plurality of vibration portions is disposed at the corners.

* * * * *